United States Patent

[11] 3,623,516

| [72] | Inventor | Chester E. Kirk |
| | | Corvallis, Oreg. |
| [21] | Appl. No. | 846,828 |
| [22] | Filed | Aug. 1, 1969 |
| [45] | Patented | Nov. 30, 1971 |
| [73] | Assignee | Speed Cut Inc. |
| | | Corvallis, Oreg. |

[54] RADIAL SAW TURNTABLE
3 Claims, 11 Drawing Figs.

[52] U.S. Cl.................................................. 143/6 A,
83/581
[51] Int. Cl............................................... B27b 5/20
[50] Field of Search.......................................... 143/6, 6 A,
47 F; 83/581

[56] References Cited
UNITED STATES PATENTS

| 1,646,589 | 10/1927 | Meek et al. .................... | 143/6 B |
| 1,697,873 | 1/1929 | Lambert........................ | 143/6 B |
| 2,559,283 | 7/1951 | Dick............................ | 143/6 B |
| 2,655,955 | 10/1953 | Dziengiel...................... | 143/6 B |

*Primary Examiner*—Donald R. Schran
*Attorney*—Kimmel, Crowell & Weaver

ABSTRACT: A turntable is provided on which a conventional radial saw is mounted so that the center of the pivotal adjustment of the saw angle is through the straightedge guide at the side of the board-supporting portion of the turntable. This arrangement provides a maximum length of cut at all angular settings of the saw with all of the cuts starting centrally of the board-supporting table.

INVENTOR
CHESTER E. KIRK
BY
Kimmel, Crowell & Weaver
ATTORNEYS

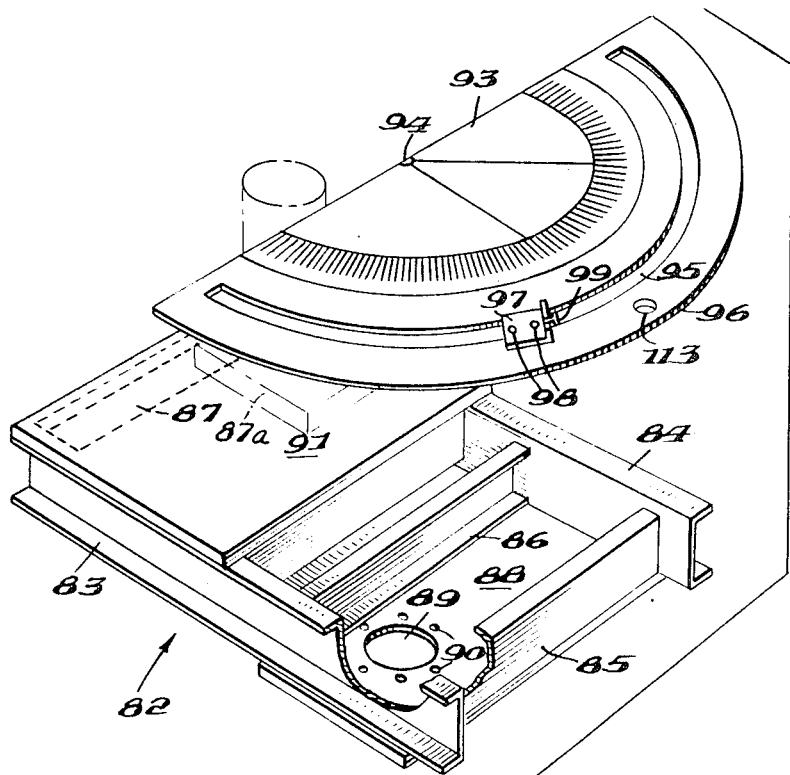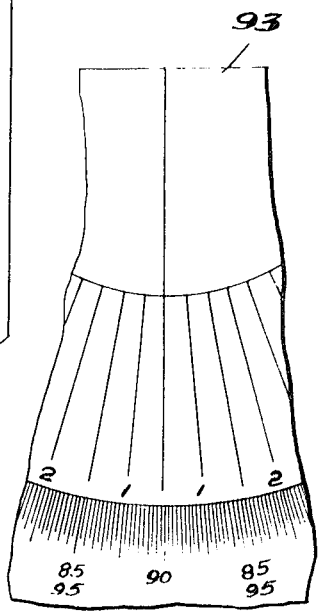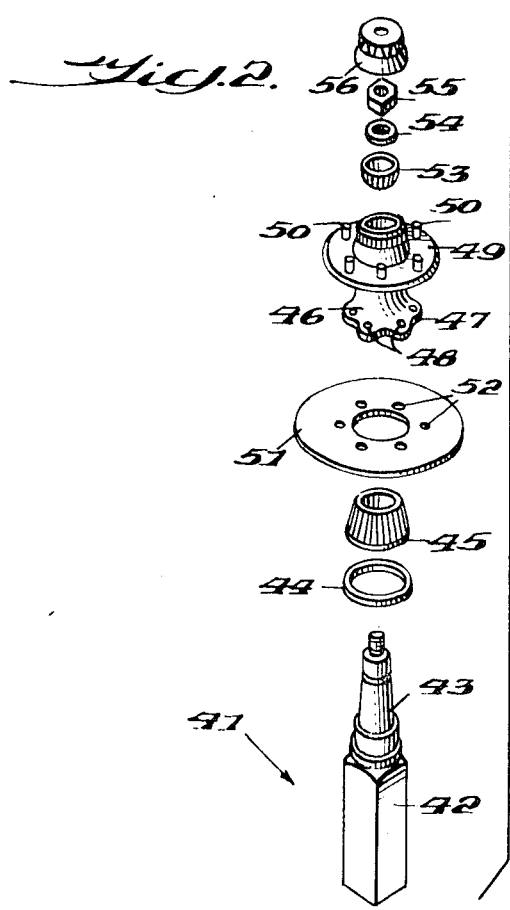

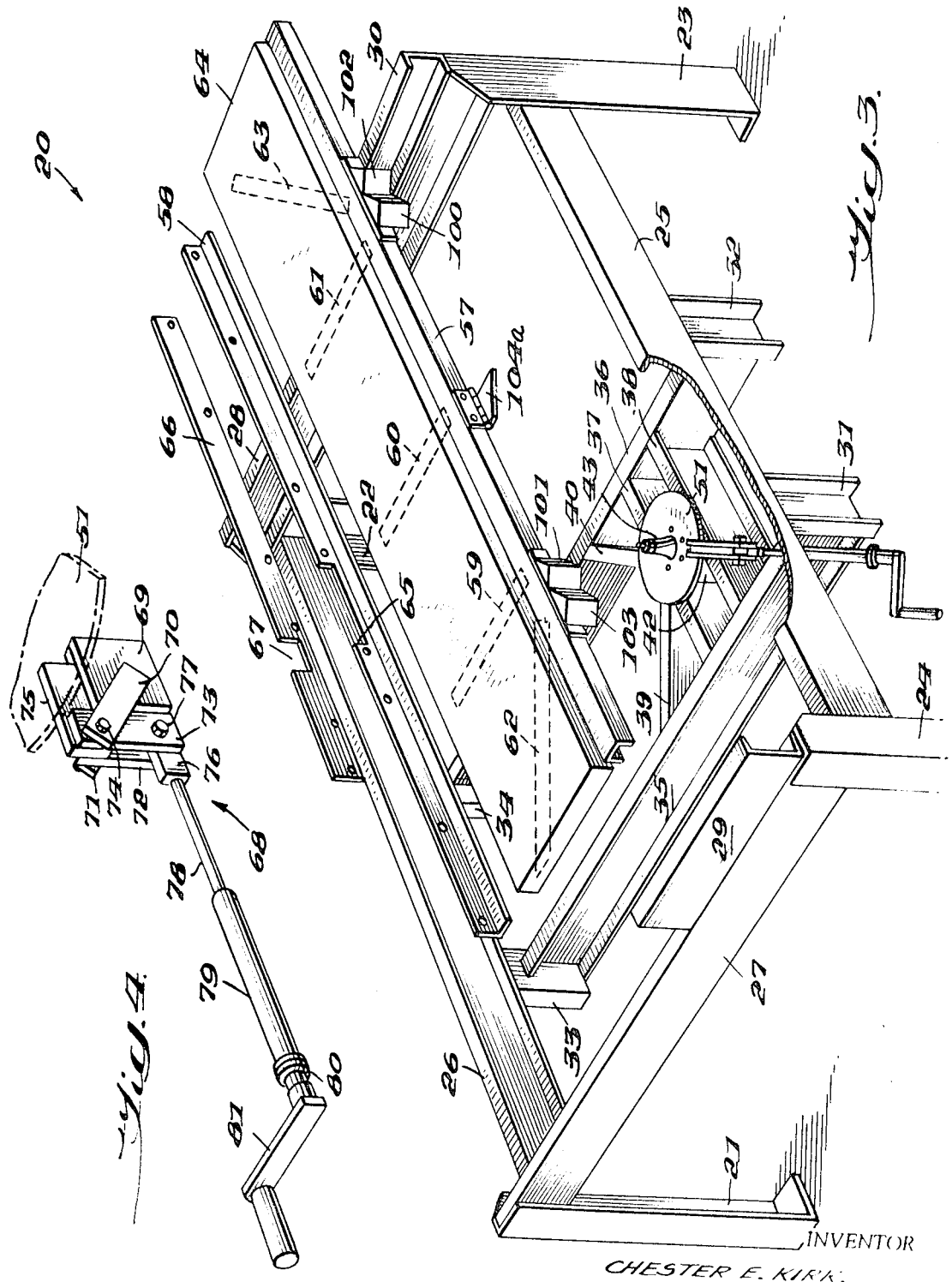

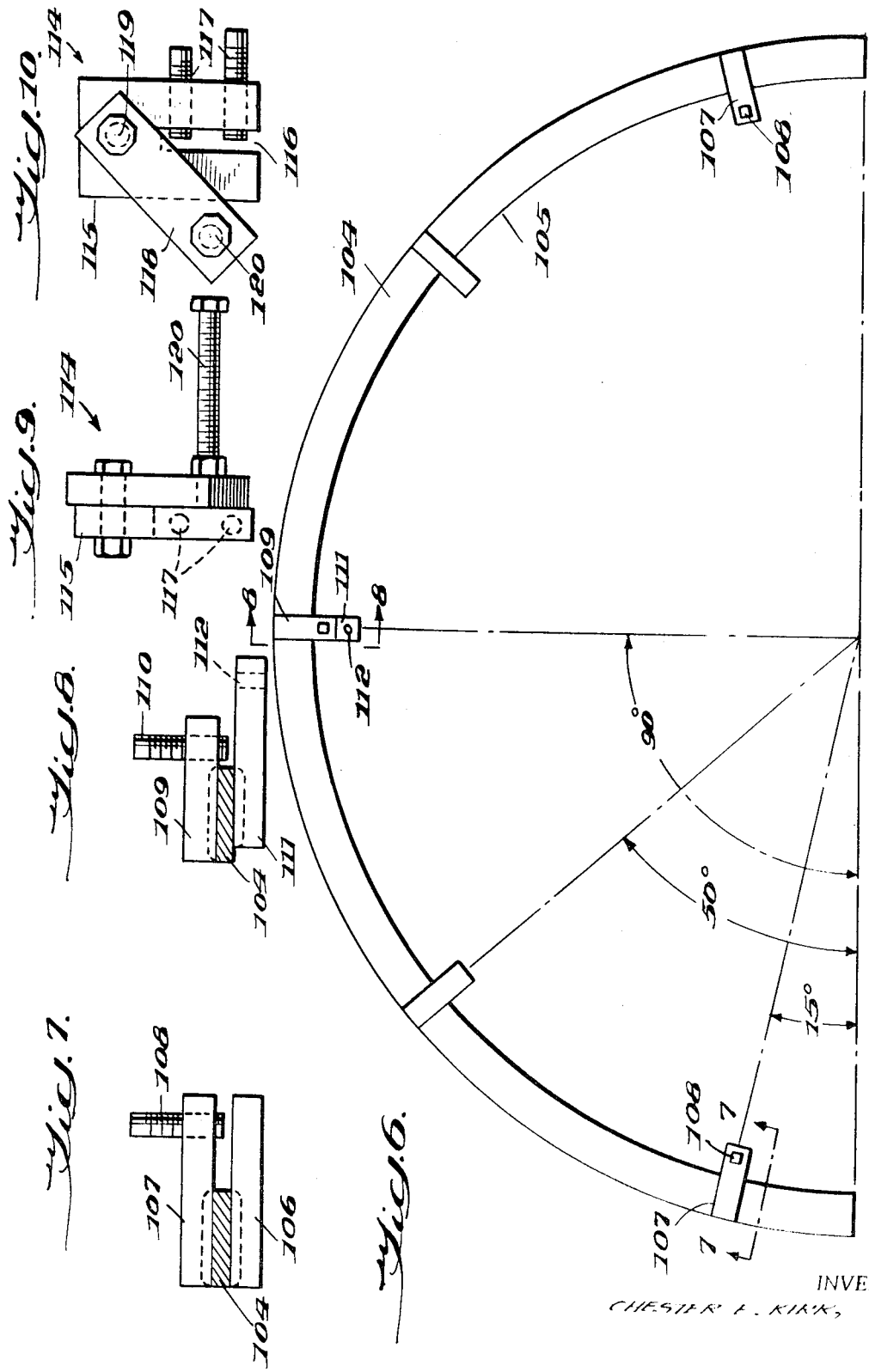

RADIAL SAW TURNTABLE

BACKGROUND OF THE INVENTION

1. Field of the Invention

The present invention relates to a turntable support structure for radial saws which permits a conventional radial saw to be mounted thereon and provides a pivotal adjustment for the saw intermediate the inner and outer ends of the saw travel with the pivot point coinciding with the straightedge of the board-supporting table.

2. Description of the Prior Art

In prior art structures, the pivot of the radial saw is substantially spaced from the straightedge of the board support table so that the point of entry of the saw when cutting at an angle is substantially removed from the point of entry of the saw when cutting perpendicularly to the board. In prior art structures, each saw table is constructed for use with a specific radial saw and cannot be readily adapted to other radial saws without completely reengineering and redesigning the structure.

SUMMARY OF THE INVENTION

The radial saw turntable of the instant invention includes a device upon which a conventional radial saw can be mounted and is provided with a protractor ring for gauging the angle of cut as well as a replaceable accessory stop ring which can be preset for establishing a number of saw cut angles which would be encountered in producing the angle cut beams for a specific house plan or other angular cut requirement.

BRIEF DESCRIPTION OF THE DRAWINGS

FIG. 2 is an exploded perspective view of the invention;

FIG. 3 is an exploded perspective view of the saw table of the present invention partially broken away for the convenience of illustration.

FIG. 4 is a fragmentary perspective view of the brake structure;

FIG. 5 is a fragmentary top plan view of the protractor ring;

FIG. 6 is a top plan view of the replaceable stop ring;

FIG. 7 is an enlarged transverse cross section taken along the line 7—7 of FIG. 6 looking in the direction of the arrows;

FIG. 8 is a fragmentary sectional view taken along the line 8—8 of FIG. 6 looking in the direction of the arrows;

FIG. 9 is a side elevation of one of the stops;

FIG. 10 is an end elevation of the stop illustrated in FIG. 9; and

DESCRIPTION OF THE PREFERRED EMBODIMENT

Figure 1:
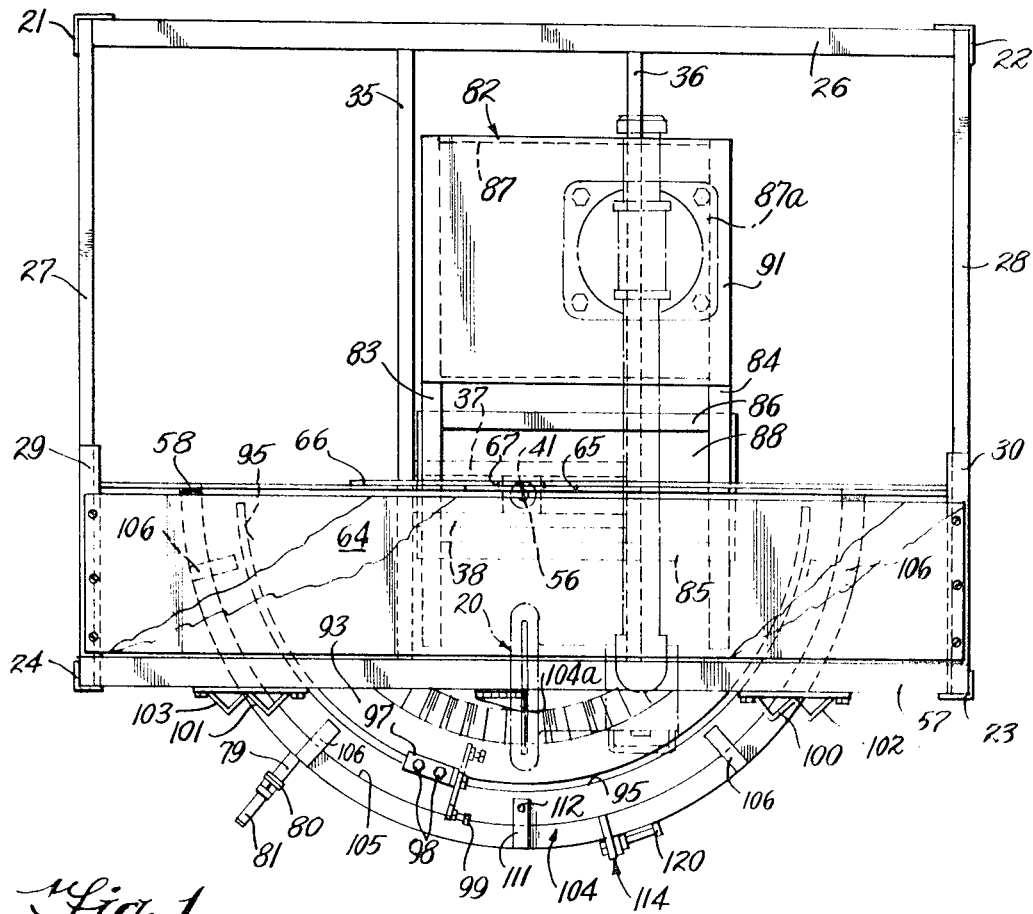
FIG. 1 is a top plan view of the invention illustrating the angles of cut and the center of the pivot of the saw.

Referring now to the drawings in detail wherein like reference characters indicate like parts throughout the several FIGS., the reference numeral 20 indicates generally a turntable assembly for radial arm saws constructed in accordance with the invention.

The turntable assembly 20 includes a stationary support having four upright legs 21, 22, 23, and 24. The front legs 23, 24 are connected by a longitudinal horizontal frame member 25 and the legs 21, 22 are connected by a similar longitudinal horizontal frame member 26. The legs 21, 24 are connected by a transverse horizontal frame member 27 and the legs 22, 23 are connected by a transverse horizontal frame member 28.

A relatively short table support channel 29 is secured to the transverse frame member 27 and extends rearwardly from the leg 24. A second relatively short table support frame member 30 is secured to the transverse frame member 28 and extends rearwardly from the leg 23. The frame members 29, 30 are secured to the upper faces of the transverse frame members 27, 28 respectively.

A pair of spaced-apart depending channel members 31, 32 are arranged in parallel relation and depend from the longitudinal frame member 25. A second pair of spaced-apart parallel channel members 33, 34 are secured to and depend from the longitudinal frame member 26 in opposed relation to the channel members 31, 32. A transverse frame member 35 has its opposite ends secured to the channel members 31, 33 and a second transverse frame member 36 has its opposite ends secured to the channel members 32, 34 respectively, with the transverse frame members 35, 36 extending parallel to each other horizontally and perpendicularly to the longitudinal frame members 25, 26. A pair of spaced-apart parallel horizontal channel members 37, 38 extend between and have their opposite ends connected respectively to the transverse frame members 35, 36. A frame member 39 extends at an angle from the transverse frame member 35 to a point centrally of the channel member 37 and a second frame member 40 extends angularly from the transverse frame member 36 to a point centrally of the channel member 37 to provide stiffening bracing of the framework.

An upright trunnion generally indicated at 41 includes a lower portion 42 having a generally square horizontal cross section and a tapered upper portion 43. The trunnion 41 is positioned intermediate the frame members 35, 36 and has the lower portion 42 thereof engaged between the channel members 37, 38 and secured thereto. The upper portion 43 of the trunnion 41 projects upwardly above the upper surfaces of the channel members 37, 38 and the frame members 35, 36.

Figure 11:
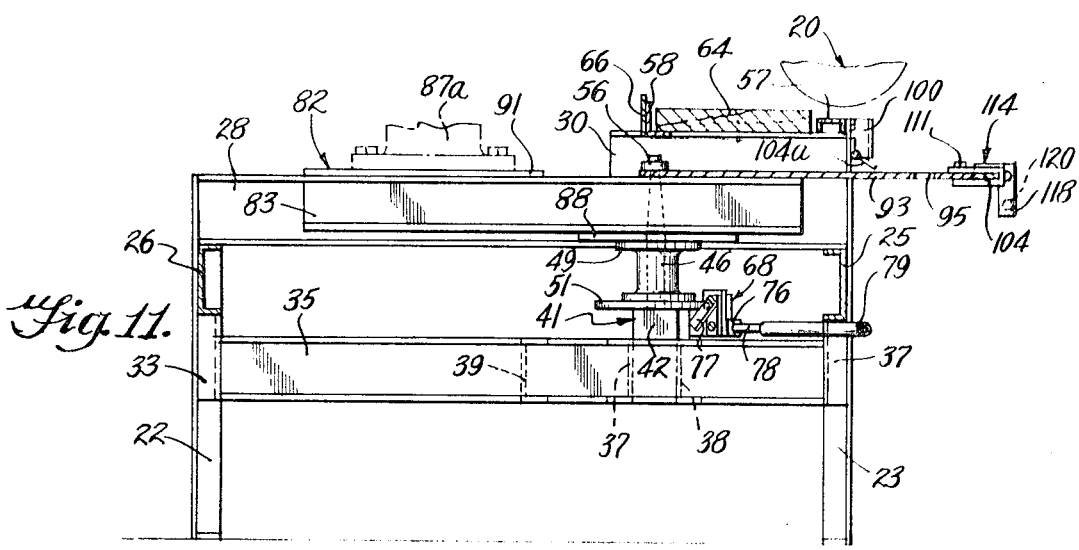
FIG. 11 is a medial cross-sectional view of the support structure and the turntable, a fragment of the saw blade being shown for purposes of orientation in phantom lines.

Referring now to FIG. 2, a grease seal 44 engages over the upper portion 43 of the trunnion 41 and is positioned closely adjacent the point where the lower portion 42 and the upper portion 43 join. A lower tapered roller bearing 45 then engages over the upper portion 43 closely adjacent to the grease seal 44. A hub 46 engages over the tapered roller bearing 45 and pivots thereon. The hub 46 has a lower flange 47 with a plurality of circumferentially spaced bolt holes 48 extending therethrough. A flange 49 is formed on the upper end of the hub 46 and has a plurality of lugbolts 50 arranged in circumferentially spaced relation thereon with their axes parallel to the axis of the hub 46. A brake disk 51 is positioned in contact with the flange 47 and is provided with a plurality of bolt holes 52 to permit the brake disk 51 to be bolted to the hub 46. An upper tapered roller bearing 53 engages about the upper end of the upper portion 43 and within the hub 46. A metal washer 54 engages the bearing 53 and a nut 55 secures the washer 54 and the hub 46 in engagement with the trunnion 41 for rotary movement thereon. A grease cup 56 is secured to the hub 46 to retain a supply of grease therein for the bearings 53, 45. These components are shown in assembled condition in FIGS. 3 and 11, and it will there be observed that the trunnion is maintained in fixed position with its upper portion extending above the hub 46, and with the lugbolts 50 of the flange 49 also projecting upwardly.

A saw table leading edge frame member 57 has its opposite ends welded to the front edges of the frame members 29, 30 so as to extend longitudinally of the framework overlying and parallel to the longitudinal frame member 25. An angle iron frame member 58 is arranged parallel to the frame member 57 and has its opposite ends secured to the rear ends of the frame members 29, 30. Transversely extending frames 59, 60, 61 are welded at their opposite ends to the frame members 57, 58 and an angularly extending frame 62 is welded to the frame member 57 and to the frame member 29 to brace the frame member 57. At its opposite end an angularly extending frame member 63 is welded to the frame member 57 and to the frame member 30 to brace the frame member 57. A saw table 64 is secured to the frame members 57, 58 and extends longitudinally of the framework supported by the frame members 59, 60, 61 and the angularly extending frame members 62, 63. The frame member 58 is notched at 65 to permit the passage of the saw blade. An aluminum straightedge 66 is bolted to the frame member 58 and extends upwardly therefrom above the top of the saw table 64 to engage the work to keep it square with the saw table 64 and the saw. The straightedge 66 is notched at 67 to permit the passage of the saw blade therethrough.

A brake generally indicated at 68 cooperates with the brake disk 51 to lock the brake disk 51 and the hub 46 against rotary movement when desired. The brake 68 includes a block 69 which is welded to the channel member 38 in a position underlying the brake disk 51. A pair of angularly extending ears 70, 71 are secured to opposite sides of the block 69 and extend upwardly and outwardly therefrom in spaced-apart parallel relation. A pair of lever arms 72, 73 are positioned between the ears 70, 71 and pivotally connected thereto by a pivot pin 74. A brake jaw 75 is positioned between the lever arms 72, 73 and extends perpendicularly thereto in generally parallel relation to the upper surface of the block 69 and overlying the brake disk 51. The jaw 75 is welded to the lever arms 72, 73 to form a bellcrank lever so that upon pivotal movement of the lever arms 72, 73, the jaw 75 can be pressed downwardly against the brake disk 51 so as to bind the brake disk 51 against rotary movement. A lever block 76 is positioned between the lower ends of the lever arms 72, 73 and is pivotally connected thereto by a pivot pin 77. A shaft 78 is rigidly connected to the lever block 76 and extends outwardly therefrom. The shaft 78 is slidably mounted in a tubular support 79 which is welded to the lower side of the longitudinal frame member 25. The shaft 78 is threaded at its outer end and a nut 80 secured to a crank 81 is threaded thereon so that rotation of the crank 81 will move the shaft 78 to apply and release the brake jaw 75 to the brake disk 51.

In FIG. 2 a turntable is generally indicated at 82 to provide a mount for the radial saw. The turntable 82 includes a pair of spaced-apart parallel horizontal channel frame members 83, 84 connected by a plurality of transverse horizontal parallel channel frame members 85, 86, and 87 providing a generally rectangular frame. A relatively heavy, flat baseplate 88 is secured to the lower faces of the channel frame members 83, 84 adjacent the forward end thereof with the longitudinal edges of the baseplate 88 secured to the channel frame members 85, 86. The baseplate 88 has a large bore 89 formed therein closely adjacent the frame member 83 and generally offset with respect to the turntable 82. The bore 89 is surrounded by a plurality of stud bores 90 which are adapted to engage over the stud bolts 50 and to be secured thereon by suitable nuts, not shown. A relatively heavy generally rectangular mounting plate 91 is secured to the upper surfaces of the channel frame members 83, 84 at the end thereof opposite the baseplate 88 and provides a mounting plate for a radial saw which is secured to the plate 91 adjacent the channel frame member 84 so that the line of travel of the saw blade 92 is directly over the center of the trunnion 41, the location of which is shown by the reference numeral 41 and the dotted lead line in FIG. 1. The particular means for mounting of the saw is variable depending on saw base structure. In the illustrated embodiment, a solid base 87a (FIGS. 2 and 11) is fixably mounted on the plate 91, and extends upwardly to support a saw structure of the type generally shown in FIG. 1.

A protractor plate 93 is secured to the channel frame members 83, 84 and projects outwardly toward the front edge of the saw table 64 with the point 94 on the protractor plate 93 coinciding with the axis of the trunnion 41. The protractor 93 is calibrated in quarter degrees on one scale and in specific roof pitches on a second scale to provide extreme accuracy in use. The protractor 93 is provided with an arcuate slot 95 adjacent its outer arcuate edge 96. A quick adjustment stop 97 is mounted in the slot 95 and is adapted to be clamped thereto by a pair of bolts 98. A fine-adjusting screw 99 is positioned in the quick adjusting stop 97 for engagement with the stop block 100 or 101, depending upon the direction of rotation of the turntable 82. The stop blocks 100, 101 are mounted on the frame member 57 along with stop blocks 102, 103 spaced outwardly therefrom. A hinged pointer 104a is mounted on the frame member 57 and is adapted to cooperate with the scales of the protractor 93 to indicate the position of the saw blade 92.

An interchangeable stop ring 104 illustrated in FIG. 6 is semicircular in form and has an inner circumference 105 slightly greater than the outer circumference of the protractor plate 93. The interchangeable stop ring 104 is adapted to be secured to the protractor plate 93 by means of a pair of ears 106, 107 which are welded to the upper and lower surfaces of the stop ring 104 and extend inwardly in spaced parallel relation therefrom. The ears 106, 107 engage over the upper nd lower faces of the protractor plate 93 and are clamped thereto by means of a set screw 108 which is threaded through the ear 107. The ring 104 is not specifically illustrated on the plate 93, but it will be noted in the drawing that the ring is readily adapted for releasable engagement thereon by the beforementioned clamping procedure.

An ear 109 is positioned centrally of the stop ring 104 and carries a setscrew 110 threaded therethrough. A second ear 111 is arranged in spaced parallel relation to the ear 109 and both are welded to the stop ring 104 in the same manner as the ears 106, 107. The ear 111 is somewhat longer than the ear 109 and has a vertical bore 112 in its inner end which is adapted to be aligned with a bore 113 in the outer edge portion of the protractor plate 93 so that the interchangeable stop ring 104 is exactly lined up with the protractor plate 93 each time that it is removed and replaced.

Removable adjustable stops generally indicated at 114 are adapted to be positioned on the stop ring 104 at any point thereon as required by the design of the timbers being cut. The stop 114 consists generally of a rectangular plate 115 having a slot 116 formed therein to receive the interchangeable stop ring 104 therein. Setscrews 117 extend through the plate 115 and are adapted to clamp the plate 115 onto the interchangeable stop ring 104. A pivoted stop block contacting member 118 is pivoted by a bolt 119 to the plate 115 and carries a fine-adjustment bolt 120 adjacent its outer end for engagement with either of the stop blocks 102, 103, depending upon the rotation of the turntable 82. This adjustment, with the ring 104 clamped to the plate 93 in the manner described above, ensures that the angle of cut of the saw relative to a workpiece on the table 64 will be on the angle selected for adjustment on the protractor.

The function of the radial saw turntable 20 of the instant invention is twofold in purpose. Initially, the turntable provides a universal mount for any radial arm saw to establish a pivot for the saw which is directly under the path of travel of the saw blade on its radial arm so that the cut passes through the same point on the straightedge for any angle of cut. This is accomplished through the pivot of the turntable 82 on the trunnion 41, the table carrying the saw support on its plate 91. Secondarily, the turntable 20 provides an extremely accurate angular adjustment for the saw along with a protractor and stop ring system which can be preset to provide a plurality of angular cuts such as would be used in the construction of a total house with the stop rings being quickly interchangeable when changing from one design of roof to another when cutting timbers therefor. The protractor provides a quick and accurate method of aligning the stops on the stop ring or in the slot of the protractor and the accuracy of the turntable is equal to the accuracy of the radial arm saws used therewith.

I claim:

1. The combination, with a radial arm power saw, of an adjustable mounting table for said power saw comprising:
 a base frame having a series of structural members including an upper frame and intermediate transverse frame members;
 a trunnion secured to the intermediate transverse frame members and projecting upwardly;
 a saw table supported on the upper frame and having a work-engaging straightedge which overlies the trunnion;
 a turntable, including a frame having a baseplate, the baseplate being mounted on a hub pivotally engaged on the trunnion;
 a saw-mounting base fixed on said turntable and projecting upwardly therefrom, the radial arm powersaw being secured on said saw-mounting base;

a protractor plate secured to the turntable beneath the saw table and having a center point coincident with the trunnion;

the saw table having stop blocks thereon; and means on the protractor plate selectively engageable with the stop blocks on the saw table for fixing the pivot adjustment of the turntable and radial arm saw relative to the saw table.

2. The invention of claim 1, and:

means releasably clamping the turntable against pivotal movement including a brake disk secured to the hub; and a brake secured to the base frame and adapted for movement into clamping engagement with the disk.

3. The invention of claim 1, wherein:

said means on said protractor plate comprises a stop ring having a series of clamps engageable with the protractor plate.

* * * * *